C. G. SWENSON.
FAN MOUNTING.
APPLICATION FILED APR. 12, 1918.

1,278,060.

Patented Sept. 3, 1918.

Witness
Frank A. Sahle

Inventor
Carl G. Swenson,

By
Hood & Ashley
Attorneys

UNITED STATES PATENT OFFICE.

CARL G. SWENSON, OF INDIANAPOLIS, INDIANA, ASSIGNOR TO THE OAKES COMPANY, OF INDIANAPOLIS, INDIANA, A CORPORATION OF INDIANA.

FAN-MOUNTING.

1,278,060.  Specification of Letters Patent.  Patented Sept. 3, 1918.

Application filed April 12, 1918. Serial No. 228,098.

*To all whom it may concern:*

Be it known, that I, CARL G. SWENSON, a citizen of the United States, residing at Indianapolis, in the county of Marion and State of Indiana, have invented a new and useful Fan-Mounting, of which the following is a specification.

In the manufacture of automobile radiator fans, it is found that substantially the same fan is required for many different makes of automobiles; but that in attaching these fans to automobiles of different makes a different distance must be provided between the plane of attachment of the fan to the motor and the plane of the belt which drives the fan.

It is the object of my present invention to provide a construction whereby in such a radiator fan this distance may be made anything desired without requiring any change in the other parts of the fan, so that fans made of the same component parts may be used for different types of automobiles, having different distances between the plane of attachment and the plane of the driving belt.

Figure 1:
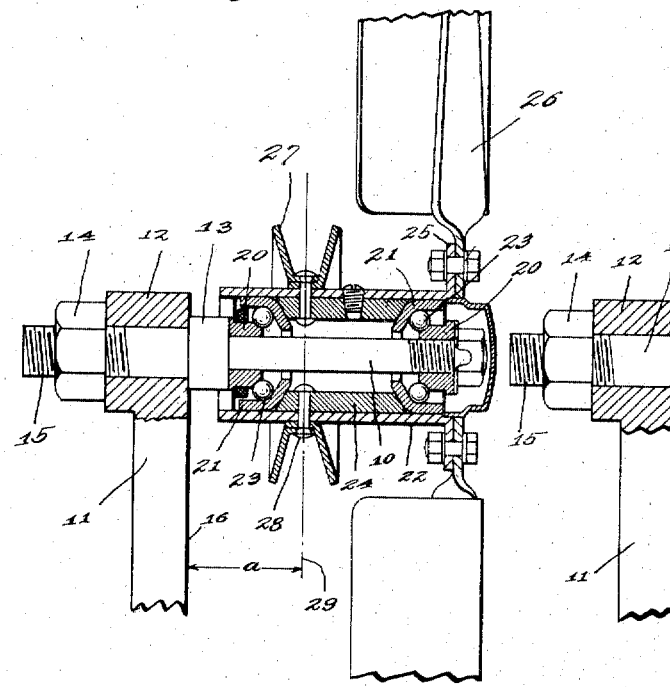
Figure 2:
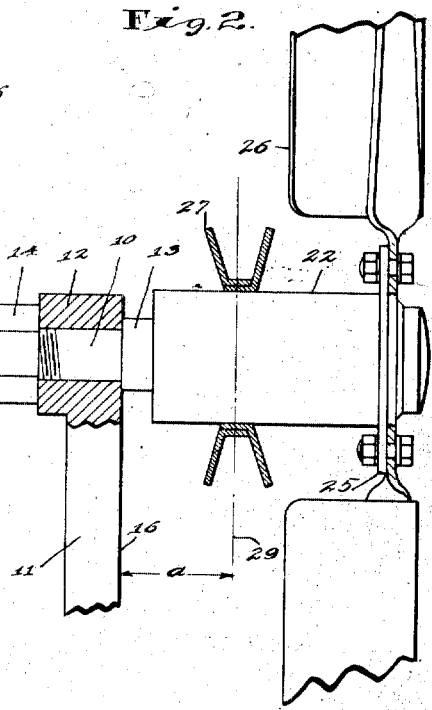
Figure 3:
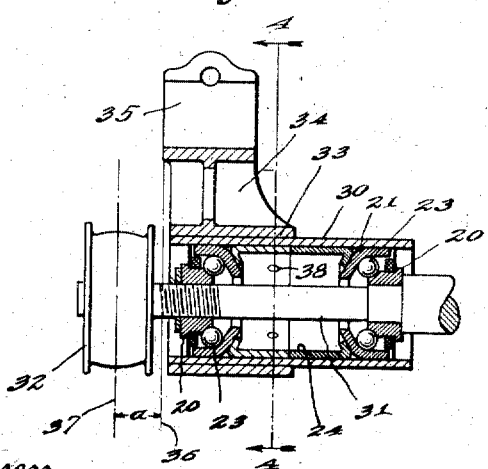

The accompanying drawing illustrates my invention. Figure 1 is an axial section through a hub-drive fan and its support, with the fan blades partly broken away, showing one embodiment of my invention, with a pulley attached to the outer member of the fan bearing by rivets; Fig. 2 is a somewhat corresponding view, but with the parts mainly in elevation, and with the pulley attached to said outer member by spot welding; Fig. 3 is a view somewhat similar to Fig. 1, but of a spindle-drive fan; and Fig. 4 is a section on the line 4—4 of Fig. 3.

In the arrangements shown in Figs. 1 and 2, there is a stationary stud shaft 10, mounted on a support 11 from the motor as by passing through a boss 12 of such support 11 and being clamped to such boss between a collar 13 on said stud shaft and a nut 14 coöperating with the threaded end 15 of said stud shaft. The plane of engagement 16 between the support 11 and the collar 13 determines the relative position of the stud shaft 10 with relation to the support 11.

The stud shaft 10 carries ball cones 20, adjustable toward and from each other as by having one of them mounted on the threaded outer end of the stud shaft 10; and between these ball cones 20 and ball races 21 mounted within a hub member 22 are located the bearing balls 23. The ball races 21 are spaced apart by a spacer 24 between them, the arrangement of spacer and ball races preferably being that covered by my co-pending application Ser. No. 228,099, of even filing date herewith. The hub member 22 is provided at one end with an outturned flange 25, to which is fastened the fan blade assembly 26. Save for this outturned flange 25, the hub member 22 is tubular in form. Mounted on this tubular hub member 22 is a pulley 27 of any suitable structure. This pulley may be fastened to the hub member 22 by spot welding, as in Fig. 2, or by rivets 28, as in Fig. 1; such rivets 28 in the latter case also preferably passing through the spacing member 24 to position it with respect to the hub member. The pulley 27 may be slid to any desired position along the hub member 22 before being fastened thereto by the spot welding or the rivets, so that the distance *a* between the plane 29 of such pulley and the aforesaid plane 16 is determined by such positioning of the pulley. In consequence, the same fan parts may be used for any desired value of the distance *a*, without requiring any other change than the positioning of the pulley 27 on the hub member 22. By this arrangement, the same fan, with all the same component parts, may be used for different types of motors, having different requirements for the distance *a*.

Figure 4:
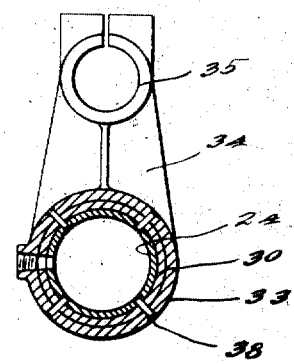

A very similar structure for obtaining similar results may also be used for a spindle-drive fan, as shown in Figs. 3 and 4. Here the outer member 30, corresponding to the hub 22 in the arrangement shown in Figs. 1 and 2, is stationary instead of rotatable, and the inner member 31, corresponding to the stud shaft 10 of Figs. 1 and 2, is rotatable instead of stationary, these inner and outer parts being relatively rotatable on ball bearings 23 mounted between ball cones 20 and ball races 21 as before, and the ball races being separated by a spacer 24, here made of sheet metal stampings. The inner rotatable member 31 carries a pulley 32 at one end, and has a fan attached thereto at the other end in any suitable manner, not shown. The outer tubular member 30 fits within a tubular socket 33 on one end of an attaching arm 34, which on the other end has a split socket 35 by which it may be attached to any suitable supporting stud on the motor, in the usual manner. The axial position of this socket 35 on its supporting stud is determined by the plane of engagement 36 between one axial end of such socket and the base of said stud, and the distance $a$ between such plane 36 and the plane 37 of the pulley 32 varies in different automobiles. This distance may be varied with the same fan parts by sliding the socket 33 and the tubular member 30 axially with relation to each other, to obtain the desired distance $a$; and after this is done the parts 30 and 33, and conveniently also the part 24, are suitably fastened together by rivets 38. By this arrangement, the same fan, comprising all the same component fan parts, may be used for motors requiring different values of the distance $a$.

I claim as my invention:

1. A fan mounting, comprising an inner member, an outer tubular member, one of said members being stationary and the other being mounted thereon for rotation relatively thereto, a fan carried by said rotatable member, a fixed support and a pulley with which said stationary and rotatable members are respectively associated, that one of said parts which is associated with the outer tubular member having an initial slidable fit over said tubular member so that it can be brought to different axial positions thereon in assembling and being rigidly attached to said tubular member after being brought to the desired position so as to fix the variable axial distance between the plane of said pulley and the plane of said support.

2. A fan mounting, comprising an inner member, an outer tubular member, one of said members being stationary, ball bearings by which the other of said members is mounted on the fixed member, a fan carried by said rotatable member, a fixed support and a pulley with which said stationary and rotatable members are respectively associated, that one of said parts which is associated with the outer tubular member having an initial slidable fit over said tubular member so that it can be brought to different axial positions thereon in assembling and being rigidly attached to said tubular member after being brought to the desired position so as to fix the variable axial distance between the plane of said pulley and the plane of said support.

3. A fan mounting, comprising an inner member, an outer tubular member, one of said members being stationary and the other being mounted thereon for rotation relatively thereto, a fan carried by said rotatable member, a fixed support and a pulley with which said stationary and rotatable members are respectively associated, that one of said parts which is associated with the outer tubular member having an initial slidable fit over said tubular member so that it can be brought to different axial positions thereon in assembling, rivets attaching together said tubular member and the part associated therewith after they are assembled in proper position and thereby fixing the variable axial distance between the plane of said pulley and the plane of said support.

4. A fan mounting, comprising an inner member, an outer tubular member, one of said members being stationary, a pair of spaced ball bearings between said two members, a spacer within said tubular member for spacing apart the ball races of said two ball bearings, a fan carried by said rotatable member, a fixed support and a pulley with which said stationary and rotatable members are respectively associated, that one of said parts which is associated with the outer tubular member having an initial slidable fit over said tubular member so that it can be brought to different axial positions thereon in assembling, rivets attaching said spacer to said tubular member and both to the part associated with said tubular member after they are assembled in proper position and thereby fixing the variable axial distance between the plane of said pulley and the plane of said support.

In witness whereof, I have hereunto set my hand at Indianapolis, Indiana, this tenth day of April, A. D. one thousand nine hundred and eighteen.

CARL G. SWENSON.